W. A. TILNEY.
PROTRACTOR.
APPLICATION FILED OCT. 1, 1915.
1,179,242.
Patented Apr. 11, 1916.
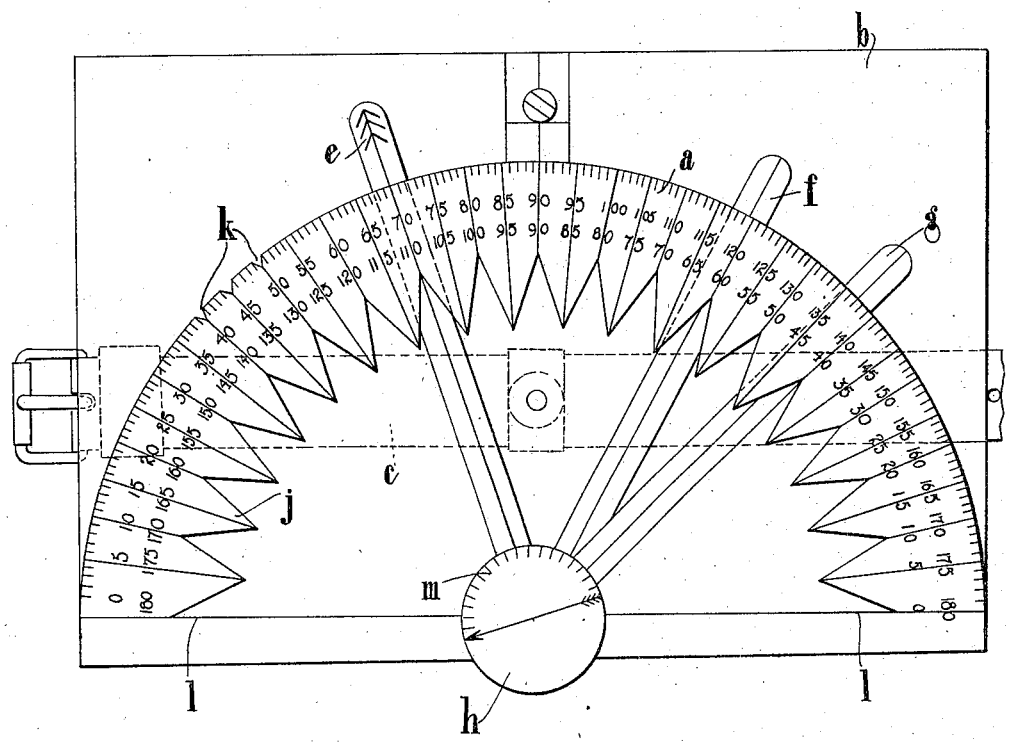
Inventor:
William A. Tilney,
by Spear, Middleton, Donaldson & Spear
Attorneys.

UNITED STATES PATENT OFFICE.

WILLIAM ARTHUR TILNEY, OF SCARBOROUGH, ENGLAND.

PROTRACTOR.

1,179,242.   Specification of Letters Patent.   Patented Apr. 11, 1916.

Application filed October 1, 1915.  Serial No. 53,632.

*To all whom it may concern:*

Be it known that I, WILLIAM ARTHUR TILNEY, lieutenant colonel, a subject of the King of Great Britain and Ireland, residing at the Cavalry Barracks, Scarborough, England, have invented a Protractor, of which the following is a specification.

The present invention relates to a method of and instrument for determining the true bearing of terrestrial or heavenly bodies, and indicating direction of march or flight in relation to such bodies, and relates more particularly to the use of stars for such directive purposes.

The object of the present invention is to provide an instrument for indicating true direction of march or flight so that troops may be enabled to march or fly by night or day at any desired pace, without the continuous use of a magnetic compass while so marching or flying, and which shall also be available for quickly determining the true bearing of any heavenly or terrestrial bodies by which such march or flight is to be directed.

The invention consists broadly in an instrument comprising in combination a base, a magnetic compass or needle secured to the said base, and two or more pointers movable relatively to each other and to the base.

The invention further consists in using the base of a protractor as the base, the center of the compass, and the point about which the pointers are movable being situated substantially at the center or either end of the protractor base.

The invention further consists in the improved instruments for determining the true and relative bearings of heavenly and terrestrial bodies, and indicating direction of march or flight in relation to such bodies, hereinafter described.

The accompanying drawing illustrates one form of the invention, viz: a form in which the base of the protractor is used as the base of the instrument.

In carrying the invention into effect according to the form illustrated, there is provided a protractor $a$, secured to or formed in one with a bed plate $b$, which may be of any suitable material, but being preferably made of metal. A wrist strap $c$, or a suitable hook, socket or handle may be provided on the under side of the bed plate.

Between the protractor and the bed plate there are mounted two or more movable pointers $e$, $f$, $g$, which are pivoted substantially at the center of the protractor base $l$, $l$.

Suitable devices, such as spring washers or interleaved stationary washers, may be provided to cause the pointers to move with sufficient stiffness to retain their position when subjected to vibration.

In some cases notches are provided in the periphery of the protractor to facilitate the counting of degrees, and the correct positioning of the pointers by touch at night. There may also be provided preferably at every ten degrees inwardly projecting tongues such as $j$ to mark such 10 degree intervals by touch.

The protractor may conveniently be divided into 180 degrees, numbered at every 10th degree, the numbering of the degrees being repeated in reverse order to facilitate the reading of angles from either end of the base. It is to be understood that in some cases no scale divisions or numerals are provided on the protractor.

Above the center of the protractor base, $l$, $l$, a magnetic compass $h$ is provided, the needle of which consequently moves about substantially the same center as the pointers, $e$, $f$, $h$. The sole object of this magnetic needle is to set the base $l$, $l$ on a true N. and S. line when the North Star or Southern Cross is not visible.

Indicating marks $m$ may if desired be provided upon the compass face, corresponding with and forming continuations of center line marked upon the tongues $j$.

Certain parts of the protractor, pointers and compass may be coated with luminous composition, and in the case of the protractor, the divisions may be marked in dark lines on the luminous background.

To use the instruments for the determination of the true bearing of, for example, a terrestrial body lying to the right hand of the observer, the instrument is held as level as possible and moved to bring the point of the compass needle over the magnetic north mark of the compass face, the base then points true north and south, or if the North Star is available the base $l$, $l$, is placed so that it lies N. and S. with respect to the North Star. One of the pointers, for example, the pointer $e$ is then moved till it points in the direction of the object whose bearing is required. It is then a simple matter to read the number of degrees between the true meridian and the line joining the observer and the object. In the case of an object lying on the left hand of the observer, the same procedure is followed.

As an example of the use of the instrument for indicating the direction of a march or flight, let it be supposed that a messenger is required to make a journey in a direction due east, either by day or on a night when no stars, sun or moon are visible. The instrument is held horizontally in the hand and moved so as to bring the point of the compass needle over the magnetic north mark, the base is then true N. and S. The pointer $e$ is then placed at right angles to the base $l$, $l$, at the mark 90 degrees, this being the map direction which the messenger is intended to follow. Either the sun is then taken, if visible or one or preferably two prominent land marks are looked for, lying to the eastward. The pointers $f$ and $g$ are then moved so as to point each to one of the selected landmarks or if working with the sun, one of the pointers $f$ or $g$ is set to the sun. All that is necessary, having thus set the instrument is to keep the single pointer on the sun, or the pointers $f$ and $g$ on their respective landmarks and march in the direction indicated by the pointer $e$.

Again as another example, when marching at night going for example due east, let it be assumed that some stars are available. The messenger seeks one or preferably two prominent stars. The instrument is held level and moved to bring the point of the compass needle over the magnetic mark "N." The base line $l$, $l$, is then true N. and S. The pointer $e$ is set at right angles to the base $l$, $l$, to the 90 degree mark and the pointers $f$, and $g$ are alined one on each of the stars selected. The march is then conducted in the direction indicated by the pointer $e$, keeping the pointers $f$ and $g$ upon the respective stars. After an interval of time for example half an hour the instrument is reset as at starting and the march continued.

It is obvious that the more frequent the resetting, the more accurate will be the direction of the march.

In the case when either the North Star or Southern Cross is available or any of the stars mentioned in the time table of direction stars for the Northern and Southern Hemispheres are visible, the base line $l$, $l$, of the protractor is set north and south and the pointer $e$ is set for the desired map direction. For example if going due east, it is set at 90 degrees, that is at right angles to the base $l$, $l$, on the right hand of the observer. The other pointers $f$ and $g$ can be directed to other suitable heavenly or terrestrial bodies, so as to provide a plurality of fixed direction points to enable the true map direction to be followed even if clouds or other obstructions temporarily obscure some of the points.

It will be obvious that more than three pointers may be provided to enable several direction bodies to be set for, this being a particularly valuable feature in cloudy weather, when clouds are liable to obscure certain of the direction stars or bodies after the journey has commenced.

In an alternative form of the instrument and in the case in which it is not required to measure the true bearings of bodies to an exact number of degrees, the central portion of the protractor and the bed plate $b$ may be omitted, the base bar $l$, $l$, alone being retained. The compass may be situated either at the center of the length of the base bar, or at one of its ends. It is convenient that the center about which the compass needle swings shall lie over an edge of the base bar so that this edge forms the base line $l$, $l$, of the instrument. Two or more pointers are provided as before and are pivoted to the base bar at or near the center of the compass and may be provided with spring washers or the like with or without a clamping device to secure all the pointers when adjusted. The periphery of the compass may have the usual rhumbs marked on it, and if the rim of the compass case is of appreciable breadth, these marks may be continued across the rim to facilitate the setting of the pointers, which may have center lines marked upon them to enable them to be set against the desired rhumb. The rhumbs may have numerals against them to denote angles measured from the base line. This form of the invention may be used in similar manner to the form already described and provides a convenient construction for folding up into a small space.

In a still simpler form of the instrument, the base bar itself may be pivoted. The instrument may then comprise a compass having three or more pointers pivoted on its case substantially beneath the pivot upon which the compass needle swings. Suitable clamping devices may if desired be provided as in the other forms.

It will readily be realized from the foregoing that the chief advantages of an instrument according to the present invention, and the methods of using such an instrument, lie in the facts that it obviates all the difficulties of magnetic variation and is a true bearing compass whereas when marching by means of the ordinary magnetic compass only a slow rate of progress is possible, owing to the necessity for frequently stopping to orientate the compass to correct the course, when using the methods and instruments forming the subject of the present invention a rapid pace may be maintained, for the instrument when set up can if desired be carried in the hand and constantly consulted, irrespective of the speed at which the operator is traveling, and the jolting to which the instrument may be subjected. Furthermore, all the advantages of using a compass of small bulk while retaining great accuracy of indication are obtained. The pointers being of substantial length enable a great degree of accuracy in the indication of direction to be obtained.

It is obvious that many variations may be made in carrying out the present invention.

Although the compass is usually conveniently combined with my new instrument, it is to be understood that the compass may be omitted when the observer is sufficiently acquainted with the positions of the heavenly bodies.

In the illustration the compass needle is shown pointing to the magnetic north and the line $l$ $l$ is set by the observer to the true north.

Having now described my invention, what I claim as new and desire to secure by Letters Patent is:—

1. An instrument comprising in combination a protractor, a magnetic compass or needle secured at the center of the base of said protractor and two or more pointers pivoted substantially at the center of the base and movable relatively to each other and to the base whereby the course of march may be set by reference to the bearings of terrestrial or heavenly bodies.

2. An instrument comprising in combination, a protractor, pointed tongues formed along the inner edge of the said protractor, corresponding to definite angular intervals, a magnetic compass or needle secured at the center of the base of the said protractor, and two or more pointers pivoted substantially at the center of the base and movable relatively to each other and to the base.

In testimony whereof I have signed my name to this specification.

WILLIAM ARTHUR TILNEY.

Copies of this patent may be obtained for five cents each, by addressing the "Commissioner of Patents, Washington, D. C."